United States Patent [19]

Weaver et al.

[11] Patent Number: 5,697,440
[45] Date of Patent: Dec. 16, 1997

[54] CONTROL OF PARTICULATE FLOWBACK IN SUBTERRANEAN WELLS

[75] Inventors: Jimmie D. Weaver; Philip D. Nguyen; Steven F. Wilson, all of Duncan, Okla.

[73] Assignee: Halliburton Energy Services, Inc., Duncan, Okla.

[21] Appl. No.: 582,818

[22] Filed: Jan. 4, 1996

[51] Int. Cl.[6] .................................................. E21B 43/04
[52] U.S. Cl. ............................................ 166/281; 166/295
[58] Field of Search .................................. 166/308, 280, 166/295, 300, 281

[56] References Cited

U.S. PATENT DOCUMENTS

| | | |
|---|---|---|
| 4,888,240 | 12/1989 | Graham et al. . |
| 4,895,207 | 1/1990 | Friedman et al. .................... 166/276 |
| 5,218,038 | 6/1993 | Johnson et al. . |
| 5,316,792 | 5/1994 | Harry et al. . |
| 5,330,005 | 7/1994 | Card et al. ............................ 166/280 |
| 5,420,174 | 5/1995 | Dewprashad . |
| 5,425,994 | 6/1995 | Harry et al. . |
| 5,439,055 | 8/1995 | Card et al. ............................ 166/280 |
| 5,501,274 | 3/1996 | Nguyen et al. ....................... 166/276 |
| 5,501,275 | 3/1996 | Card et al. ............................ 166/280 |
| 5,520,250 | 5/1996 | Harry et al. .......................... 166/278 |
| 5,551,514 | 9/1996 | Nelson et al. ........................ 166/280 |
| 5,582,249 | 12/1996 | Caveny et al. ....................... 166/276 |

*Primary Examiner*—Frank Tsay
*Attorney, Agent, or Firm*—Robert A. Kent

[57] ABSTRACT

The addition of an elastomeric material in intimate mixture with resin-coated particulates for fracturing, gravel packing or other formation treatments decreases or substantially eliminates the flowback of particulates whether proppants or formation fines while stabilizing the particulate and importing elasticity thereto within the formation. Preferred elastomeric materials include, polyolefins, polyamides, polyvinyls and cellulose derivatives in the form of particles, ribbons, fibers or flakes.

20 Claims, No Drawings

CONTROL OF PARTICULATE FLOWBACK IN SUBTERRANEAN WELLS

BACKGROUND OF THE INVENTION

1. Field of the Invention

This invention relates to means for recovering hydrocarbons from a subterranean formation and more particularly to a method and means for controlling particulate solids transport during the production of hydrocarbons from a subterranean formation.

2. Brief Description of the Prior Art

Transport of particulate solids during the production of hydrocarbons from a subterranean formation is a continuing problem. The transported solids can erode or cause significant wear in the hydrocarbon production equipment used in the recovery process. The solids also can clog or plug the wellbore thereby limiting or completely stopping fluid production. Further, the transported particulates must be separated from the recovered hydrocarbons adding further expense to the processing.

The particulates which are available for transport may be present due to an unconsolidated nature of a subterranean formation and/or as a result of well treatments placing particulates in a wellbore or formation, such as, by gravel packing or propped fracturing.

In the treatment of subterranean formations, it is common to place particulate materials as a filter medium and/or a proppant in the near wellbore area and in fractures extending outwardly from the wellbore. In fracturing operations, proppant is carried into fractures created when hydraulic pressure is applied to these subterranean rock formations to a point where fractures are developed. Proppant suspended in a viscosified fracturing fluid is carried outwardly away from the wellbore within the fractures as they are created and extended with continued pumping. Upon release of pumping pressure, the proppant materials remain in the fractures holding the separated rock faces in an open position forming a channel for flow of formation fluids back to the wellbore.

Proppant flowback is the transport of proppant sand back into the wellbore with the production of formation fluids following fracturing. This undesirable result causes undue wear on production equipment, the need for separation of solids from the produced hydrocarbons and occasionally also decreases the efficiency of the fracturing operation since the proppant does not remain within the fracture and may limit the width or conductivity of the created flow channel.

Currently, the primary means for addressing the proppant flowback problem is to employ resin-coated proppants, resin consolidation of the proppant or forced closure techniques. The cost of resin-coated proppant is high, and is therefore used only as a tail-in in the last five to twenty five percent of the proppant sand placement. Resin-coated proppant is not always effective since there is some difficulty in placing it uniformly within the fractures and, additionally, the resin coating can have a deleterious effect on fracture conductivity.

In unconsolidated formations, it is common to place a filtration bed of gravel in the near-wellbore area in order to present a physical barrier to the transport of unconsolidated formation fines with the production of hydrocarbons. Typically, such so-called "gravel packing operations" involve the pumping and placement of a quantity of gravel and/or sand having a mesh size between about 10 and 150 mesh on the U.S. Standard Sieve Series into the unconsolidated formation adjacent to the wellbore. It is sometimes also desirable to bind the gravel particles together in order to form a porous matrix through which formation fluids can pass while straining out and retaining the bulk of the unconsolidated sand and/or fines transported to the near wellbore area by the formation fluids. The gravel particles may constitute a resin-coated gravel which is either precured or can be cured by an overflush of a chemical binding agent once the gravel is in place. It has also been known to add various binding agents or adhesives directly to an overflush of unconsolidated gravel in order to bind the particles together.

The cured resin coating on the particulate tends to be rather brittle and is subject to breakdown or failure as a result of pressure pulses such as those resulting from the sequential starting and stopping of production from a well. The pressure pulses result in fracturing of the consolidated particulate and the subsequent movement of particles in the subsequent production of fluids from the wellbore.

While this technique may function to limit some flowback, it fails to secure the particulates to one another in the manner capable of withstanding cyclic pressure applications. It would be desirable to provide a method which will physically bind particles of the particulate to one another while providing elasticity to the consolidated particulate which would further assist in preventing movement or flowback of particulates from a wellbore or formation.

SUMMARY OF THE INVENTION

The present invention provides a method and fluid for treating a subterranean formation and a resultant porous particulate pack which exhibits increased elasticity and inhibits the flow of particulates back through the wellbore with the production of hydrocarbons.

In accordance with the invention, a method of treating a subterranean formation penetrated by a wellbore is provided comprising the steps of providing a fluid suspension including a mixture of consolidatable particulate material and another elastomeric material that may be thermoplastic in nature in fiber, particulate, ribbon or flake form, pumping the fluid suspension including the mixture of particulate and elastomeric material through the wellbore and depositing the mixture in the formation. Upon deposition of the consolidatable particulate and other material mixture in the formation and consolidation of the particulate, the elastomeric material has been found to increase the elasticity of the consolidated particulate whereby it may better withstand cyclic pressure applications to prevent particulate flowback. The elastomeric material may comprise ground material having an average particle size of from about 10 to 150 mesh on the U.S. Sieve Series. When in ribbon form it may be from 2.5 to 250 microns thick, millimeters to about 6.5 millimeters wide and have a length of from about 5 millimeters to in excess of 50 millimeters. When in flake form, the material may have a thickness of from about 2.5 to about 250 microns and an average surface area of from about 2 to about 325 square millimeters. The flakes may be produced by shredding, cutting, chopping or otherwise grinding the material. When in fiber form, the material may have an average or effective diameter of from about 2 to about 200 microns and a length of at least 2 millimeters.

The thermoplastic material is effective in inhibiting the flowback of particulate in a porous pack having a size ranging from about 2 to about 400 mesh in intimate admixture with the thermoplastic material.

DETAILED DESCRIPTION OF THE PREFERRED EMBODIMENTS

In accordance with the present invention, an elastomeric and preferably thermoplastic material is incorporated in an intimate mixture with a particulate material such as conventional resin coated proppants or gravel packing materials and introduced into a subterranean formation.

As used in this specification, the term "intimate mixture" will be understood to mean a substantially uniform dispersion of the components in the mixture. The term "simultaneous mixture" will be understood to mean a mixture of components that are blended together in the initial steps of the subterranean formation treatment process or the preparation for the performance of the treatment process.

The elastomeric material may comprise substantially any elastomeric substrate material that does not undesirable chemically interact with other components used in treating the subterranean formation. The material preferably comprises thermoplastic material capable of softening upon heating or softening at the temperature of the subterranean formation whereby it may adhere to the particulates with which it is introduced. Examples of suitable materials include polyolefins including polyethylene, polypropylene, polybutylene polymers and fluoropolymers and copolymers, polyimides, polyurethanes, polysulfones, polycarbonates and cellulose derivatives.

The elastomeric material may be utilized in substantially any physical form, such as for example, ground material, ribbons, flakes, fibers and the like.

The elastomeric material may comprise ground material having an average particle size of from about 10 to about 150 mesh on the U.S. Sieve Series. When the material is in the form of a ribbon, it may be from about 2.5 to about 250 microns thick, from about 0.4 to about 6.5 millimeters wide and from about 5 to in excess of from about 50 millimeters in length. When in flake form the elastomeric material may have a thickness of from about 2.5 to about 250 microns and may have either a regular of irregular shape and will have a surface area in the range of from about 2 to about 325 square millimeters. When in fiber form, it may have an average or effective diameter of from about 2 to about 200 microns and a length of at least about 2 millimeters. The length of the fibers is limited only by the practical applications of handling, pumping and the like. The current practical limit to the length is about 100 millimeters. The quantity of elastomeric material used in the intimate mixture can range from about 0.01% to about 15 percent by weight of the particulate. Preferably, the material concentration ranges from about 0.1 to about 5 percent by weight of the particulate.

In one embodiment, the elastomeric material may include an adhesive coating on the substrate elastomeric material. The adhesive coating placed on the substrate material comprising flakes, fibers, ribbons and the like described herein may be incorporated on the material during manufacture or subsequent thereto. The coating may be applied to the entire substrate material or only one side or even only various spots on the substrate. It is not necessary that the adhesive coating be uniform on the substrate. It is only necessary that sufficient adhesive be present to facilitate particulate adhesion in the subterranean formation. The coating may be sprayed or otherwise applied to the material during the coating process. One form of adhesive which may be used is one which will set over time after the adhesive coated material has been introduced into the subterranean formation. An alternate adhesive which might be used is one which will set upon treatment with a catalyst which is either introduced with the adhesive coated material into the subterranean formation or introduced prior to or subsequent to introduction of the adhesive coated material whereby the catalyst contacts the adhesive coated material within the subterranean formation.

The adhesive may comprise compounds of the type described in U.S. Pat. Nos. 5,218,038; 5,425,994; 5,420,174; 4,888,240 and the references cited therein which are incorporated herein in their entirety by reference. The adhesive may comprise thermoplastic materials such as those previously described herein for the substrate material to which the adhesive is applied as well as the various well known phenolic or furan resins described in the above cited references.

The adhesive coated material interacts mechanically with the particles of consolidatable particulate introduced into the subterranean formation to limit or prevent the flowback of particulates to the wellbore.

The elastomeric material may be incorporated with the particulate in any of the conventional fracturing or gravel packing fluids comprised of an aqueous fluid, a hydrocarbon fluid or an emulsion, a viscosifying agent and any of the various known breakers, buffers, surfactants, clay stabilizers or the like.

The elastomeric material is incorporated with the particulate as a simultaneous mixture by introduction into the fracturing or gravel packing fluid along with the particulate. The material may be introduced into the fluid before, after or simultaneously with introduction of the particulate into the fluid. The elastomeric material may be pre-blended as a mixture of dry discrete components prior to introduction into the fluid. The elastomeric material may be incorporated with the entire quantity of consolidatable particulate introduced into the subterranean formation or it may be introduced with only a portion of the particulate, such as in the final stages of the treatment to place the intimate mixture in the formation or in the vicinity of the wellbore. For example, the elastomeric material may be added to only the final 20 to 30 percent of the fluid introduced into the formation. In this instance, the intimate mixture will form a tail-in to the treatment which upon interaction within the formation with the consolidatable particulate will cause the other particles to bridge on the agglomerates formed therein to form a resilient barrier capable of withstanding cyclic pressures while still preventing movement of the particles into the wellbore with any produced fluids.

The elastomeric material upon introduction into the formation is heated to a temperature above the temperature at which the material is admixed as a simultaneous mixture. In one embodiment, the adhesive coating on the material softens as it is heated and generally becomes tacky or adhesive whereupon it adheres to or binds particles of the particulate in which it is in contact within the formation. When the material is a thermoplastic that has been subjected to either uniaxial or biaxial stress prior to addition to the particulate, the thermoplastic material may exhibit the additional property of shrinking and twisting further binding the material to the particulate. In one embodiment the material is a thermoplastic material that is subjected to biaxial stress through the formation of a film of the material. The film may be cut into ribbons, chopped or slit or shredded into flakes or small pieces and also may be comprised of multiple layers of different thermoplastic materials to vary the properties of the material. In this instance, the adhesive coating may comprise a layer of thermoplastic material bonded to another layer of material which functions as a substrate. The layered material then may be cut or shredded as desired. Thus, an adhesive coating can be combined with a material that will readily shrink or distort upon heating to improve the agglomeration properties.

The consolidatable particulate can comprise any of the resin coated particulates produced in accordance with the teaching of, for example, U.S. Pat. Nos. 5,425,994; 5,420,174; 5,316,792; 5,218,038; and 4,888,240 and the references cited therein, the entire disclosures of which are incorporated herein in their entirety by reference. The resin coated particulate may be either precoated prior to introduction into the subterranean formation or the particulate may be coated with the resin utilizing an "on-the-fly" coating process or an in-situ resin coating process of the type described in the above-identified references. The method of coating the resin upon the particulate and the particular resin employed are not critical to the accomplishment of the objective of the present invention to provide elasticity to the consolidated particulate within the formation.

To further illustrate the present invention and not by way of limitation, the following example is provided.

EXAMPLE I

The elasticity imparted by the method of the present invention to a consolidated particulate is determined in comparison to a sample of consolidated particulate containing no elastomeric material. The testing procedure was as follows: A series of equivalent samples were prepared utilizing a commercially available resin-coated proppant (RCP) identified as 20/40 mesh "ACFRAC-CR" proppant available from Borden Oilfield Product of Chicago, Ill. To a portion of the samples identified below a quantity of an elastomeric material in the form of flakes approximately 2×8 mm or 1×3 mm were added to provide a concentration of ½ percent (0.5%) by weight of proppant present. The resin-coated proppant and elastomeric material samples then were either wetted with water, mixed with water to form a pourable slurry or mixed with a quantity of a hydrated galactomannon gum to form a gel slurry. The slurry of particulates is introduced into a 0.862 inch ID glass tube, which has a rubber stopper. The rubber stopper contains a 0.20 inch diameter hole and a 100 mesh screen over the hole. The liquid is permitted to drain from the glass tube and a torque load of 4 inch - $lb_f$ is applied to the particulate in the tube. The particulate mixture then is cured at 194° F. in an oven for about 18 hours, removed, cooled, and cut into sections for compressive strength testing. The compressive strength and strain measurements were determined with a Riehler Model 120,000 mechanical property tester manufactured in Wilson, Ill. The results are set forth in Table I

TABLE I

| Sample No. | Sample Composition | Maximum Compressive Strength, psi | Strain @ Max. Compressive Strength, Micro inch/inch |
|---|---|---|---|
| 1 | RCP[1] wetted with water | 2285 | 3300 |
| 2 | RCP + 0.5% by wt. large elastomeric material wetted with water | 1281 | 4700 |
| 3 | RCP in water slurry | 1853 | 2642 |
| 4 | RCP + 0.5% by wt. large elastomeric material in water slurry | 1199 | 3015 |

TABLE I-continued

| Sample No. | Sample Composition | Maximum Compressive Strength, psi | Strain @ Max. Compressive Strength, Micro inch/inch |
|---|---|---|---|
| 5 | RCP + 0.5% by wt. small elastomeric material in water slurry | 1603 | 3987 |
| 6 | RCP in gel slurry | 1235 | 1820 |
| 7 | RCP + 0.5% by wt. large elastomeric material in gel slurry | 883 | 3520 |
| 8 | RCP + 0.5% by wt. small elastomeric material in gel slurry | 1055 | 2260 |

[1]RCP - resin coated proppant

The strain data set forth above clearly illustrates the beneficial elastic effect imparted to the consolidated particulate as a result of the inclusion of the elastomeric material.

While the present invention has been described with regard to that which is currently considered to comprise the preferred embodiments of the invention, other embodiments have been suggested and still other embodiments will occur to those individuals skilled in the art upon receiving the foregoing specification. It is intended that all such embodiments shall be included within the scope of the present invention as defined by the claims appended hereto.

EXAMPLE II

The elasticity imparted by the method of the present invention to a consolidated particulate subjected to cyclic pressure is determined in comparison to a sample containing no elastomeric material. Equivalent samples were prepared utilizing a commercially available 20/40 mesh resin-coated proppant identified as "NORCOTE SRDC with DOP" proppant available from Hepworth Minerals and Chemicals Ltd., Brookside Hall Sandbach, Cheshire, United Kingdom. A slurry was prepared with 44 ml. of a borate fracturing fluid having a pH of 12 and 44 grams of the proppant. The crosslinking agent was added to the slurry one minute after mixing of the proppant and mixing at 500 rpm was continued for 3 minutes after which the sample was transferred to the consolidation chamber. A second sample identical to the first but including elastomeric material in an amount of 0.5% by weight proppant also was prepared. The consolidation chamber comprised a cell having a cavity approximately one inch in diameter having a perforated plate at one end through which fluid could drain. The piston was inserted into the open end of the cell and sample was subjected to a 1000 psi load and cured for 16 hours at 300° F. Stress cycling was conducted at the 300° F. temperature by increasing the pressure from 1000 psi to 3000 psi over 30 minutes. The pressure is kept constant for 30 minutes and then reduced to 1000 psi over 30 minutes. After 30 minutes at 1000 psi the stress cycle was repeated until a total of five cycles had occurred. The unconfined compressive strength of each sample then was determined. The series of tests was repeated six times to achieve an average and permit standard deviation to be determined. The results are set forth in Table II, below

TABLE II

| Sample | No Stress Cycling Average Unconfined Compressive Strength (psi) | After 5 Stress Cycles Average Unconfined Compressive Strength (psi) |
| --- | --- | --- |
| Cured Proppant Sample Without Elastomeric Material | 743 (118)[1] | 454 (114) |
| Cured Proppant Sample With Elastomeric Material | 981 (188) | 889 (237) |

[1] Standard deviation for six tests

The unconfined compressive strength of the test samples clearly illustrates the beneficial elastic effect imparted to the consolidated particulate as a result of the present invention.

What is claimed is:

1. A method of treating a subterranean formation penetrated by a wellbore comprising the steps of providing a fluid suspension including a mixture of a resin-coated particulate material and elastomeric material; pumping the fluid suspension including the mixture into the subterranean formation through the wellbore; depositing the mixture of resin-coated particulate and elastomeric material in the subterranean formation whereby the resin-coated particulate is consolidated and the elastomeric material interacts with at least a portion of the particulate to retard movement within said formation of said particulate while providing additional elasticity to said consolidation resin-coated particulate in comparison to said particulate alone whereby breakdown of said consolidated particulate upon application of pressure pulses is reduced.

2. The method of claim 1 wherein the particulate is resin-coated sand and the elastomeric material comprises at least one member selected from the group of polyolefins, polyamides, polyvinyls, polyimides, polyurethanes, polysulfones, polycarbonates, polyesters and cellulose derivatives.

3. The method of claim 1 wherein the elastomeric material is in the form of ribbons having a thickness of from about 2.5 to about 250 microns, a width of from about 0.4 to about 6.5 millimeters and a length of from about 5 to about 50 millimeters.

4. The method of claim 1 wherein the elastomeric material is in the form of flakes having a thickness of from about 2.5 to about 250 microns and an average surface area of from about 2 to about 325 sq. millimeters.

5. The method of claim 1 wherein the elastomeric material is present in an amount of from about 0.01 to about 15 percent by weight of the particulate.

6. The method of claim 1 wherein the elastomeric material is in the form of fibers having a diameter of from about 2 to about 200 microns and a length of at least 2 millimeters.

7. The method of claim 1 wherein the pumping is effected at a pressure in excess of the fracturing pressure for said subterranean formation such that at least one fracture is created in said subterranean formation.

8. The method of claim 1 wherein the pumping is effected at a pressure less than the fracturing pressure for said subterranean formation such that the mixture of resin-coated particulate and elastomeric material is deposited in a near-wellbore zone.

9. Method of treating a subterranean formation penetrated by a wellbore comprising the steps of providing a fluid suspension including a mixture of a resin-coated particulate material and an adhesive coated elastomeric material; pumping the fluid suspension including the mixture into the subterranean formation through the wellbore; depositing the mixture of particulate and adhesive coated material in the subterranean formation; and heating the adhesive coated material upon introduction into the subterranean formation whereby the material interacts with at least a portion of the particulate to form a consolidated particulate having additional elasticity in comparison to consolidated resin-coated particulate alone whereby breakdown of said consolidated material upon application of pressure pulses is reduced.

10. The method of claim 9 wherein the particulate is resin-coated sand and the adhesive coated elastomeric material substrate comprises at least one member selected from the group of polyolefins, polyamides, polyvinyls, polyimides, polyurethanes, polysulfones, polycarbonates, polyesters and cellulose derivatives, glass fibers, ceramic fibers, carbon fibers or metal filaments.

11. The method of claim 9 wherein the adhesive coated material is in the form of ribbons having a thickness of from about 2.5 to about 250 microns, a width of from about 0.4 to about 6.5 millimeters and a length of from about 5 to about 50 millimeters.

12. The method of claim 9 wherein the adhesive coated material is in the form of flakes having a thickness of from about 2.5 to about 250 microns and an average surface area of from about 2 to about 325 sq. millimeters.

13. The method of claim 9 wherein the adhesive coated material is present in an amount of from about 0.01 to about 15 percent by weight of the particulate.

14. The method of claim 9 wherein the adhesive coated material is in the form of fibers having a diameter of from about 2 to about 200 microns and a length of at least 2 millimeters.

15. The method of claim 9 wherein the pumping is effected at a pressure in excess of the fracturing pressure for said subterranean formation such that at least one fracture is created in said subterranean formation.

16. The method of claim 9 wherein the pumping is effected at a pressure less than the fracturing pressure for said subterranean formation such that the mixture of particulate and adhesive coated elastomeric material is deposited in a near-wellbore zone.

17. The method of claim 9 wherein the adhesive coated elastomeric material is in the form of a particulate having a particle size in the range of from about 10 to about 150 mesh.

18. A method of treating a subterranean formation penetrated by a wellbore comprising the steps of providing a fluid suspension including a mixture of a particulate material and an elastomeric material; pumping the fluid suspension including the mixture into the subterranean formation through the wellbore; depositing the mixture in the formation; introducing a resin composition into the wellbore and into contact with at least a portion of the particulate material of said mixture whereby said resin consolidates at least a portion of said contacted particulate material in said mixture with said elastomeric material and said elastomeric material interacts with said particulate to provide additional elasticity to said consolidated particulate in comparison to consolidated particulate alone whereby breakdown of said consolidated particulate upon application of pressure pulses is reduced.

19. The method of claim 18 wherein the particulate is resin-coated sand and the elastomeric material comprises at least one member selected from the group of polyolefins, polyamides, polyvinyls, polyimides, polyurethanes, polysulfones, polycarbonates, polyesters and cellulose derivatives.

20. The method of claim 18 wherein the elastomeric material is in the form of ribbons having a thickness of from about 2.5 to about 250 microns, a width of from about 0.4 to about 6.5 millimeters and a length of from about 5 to about 50 millimeters.

* * * * *